(No Model.) 2 Sheets—Sheet 2.
R. MACRAE.
COMBINED VOLT AND AMPÈRE METER.
No. 359,619. Patented Mar. 22, 1887.
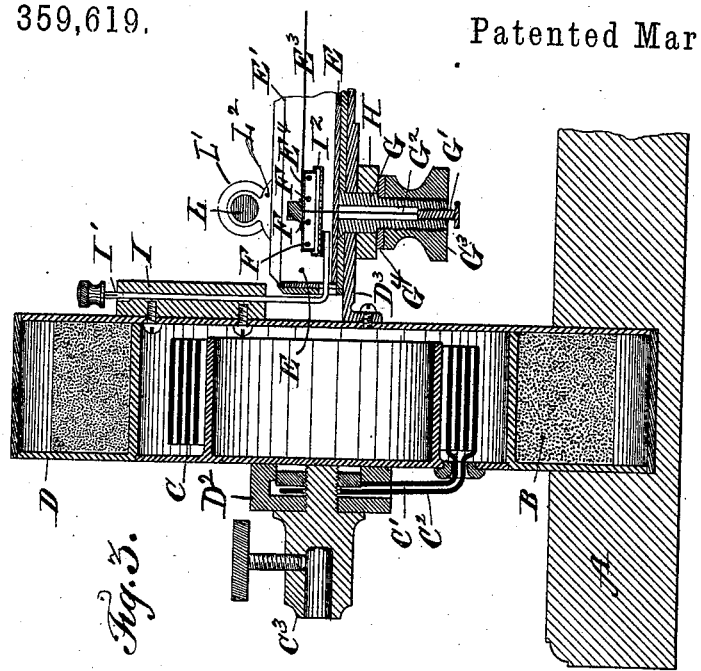
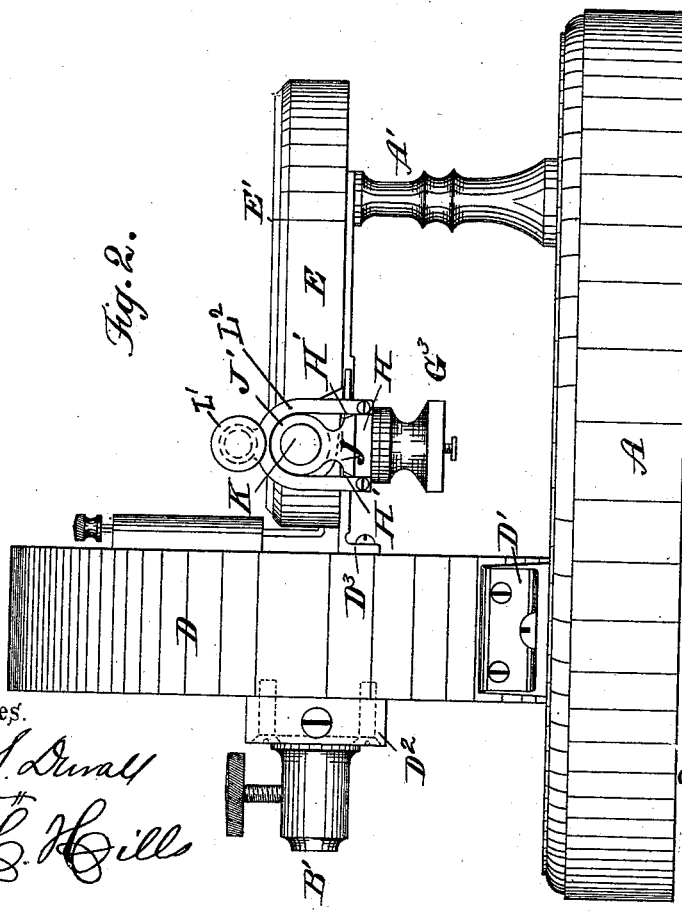

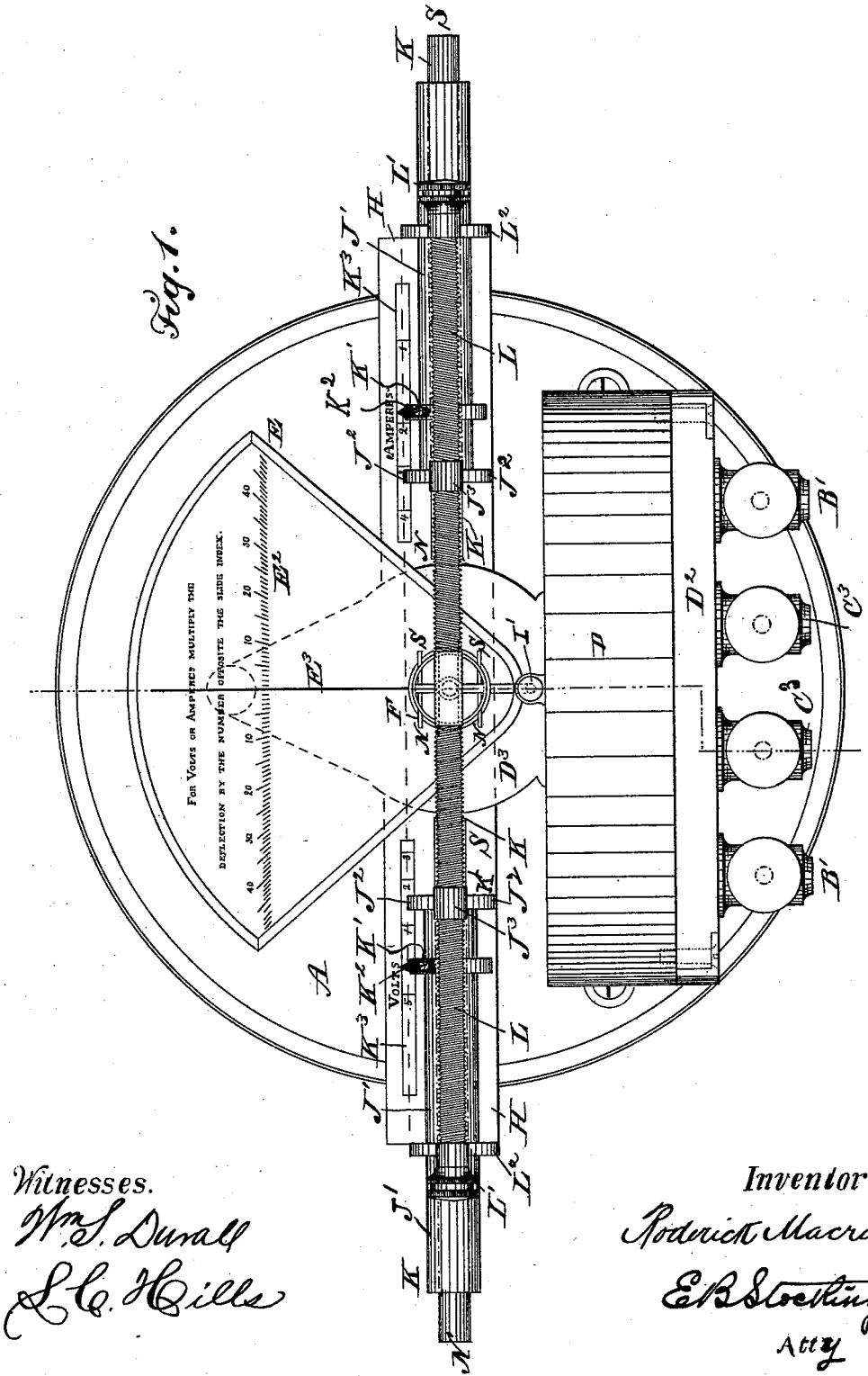

UNITED STATES PATENT OFFICE.

RODERICK MACRAE, OF BALTIMORE, MARYLAND.

COMBINED VOLT AND AMPERE METER.

SPECIFICATION forming part of Letters Patent No. 359,619, dated March 22, 1887.

Application filed April 30, 1886. Serial No. 200,649. (No model.)

*To all whom it may concern:*

Be it known that I, RODERICK MACRAE, a subject of the Queen of Great Britain, residing at Baltimore, in the State of Maryland, have invented certain new and useful Improvements in Combined Volt and Ammeter, of which the following is a specification, reference being had therein to the accompanying drawings.

This invention relates to instruments for measuring electrical currents, one of the principal objects being to provide an instrument which shall measure the electro-motive force or difference of potential, and also the strength of currents—in other words, to provide an instrument that will indicate volts and ampères.

Other objects and advantages of the invention will appear in the following description, and the novel features thereof will be particularly pointed out in the claims.

Referring to the drawings, Figure 1 is a plan, Fig. 2 is a side elevation, and Fig. 3 a central vertical section, of a combined volt and ammeter constructed in accordance with my invention.

Like letters indicate like parts in all the figures of the drawings.

A represents a suitable base, upon which is mounted a relatively large coil, B, made up of relatively fine wire, constituting a coil of high resistance, (that is, a resistance, for example, of ten thousand ohms,) the terminals of which are electrically connected with the binding-posts B' B'. Within the coil B, and arranged concentric therewith, is a low-resistance coil, C, (see Fig. 3,) the terminals C' $C^2$ of which are electrically connected with the binding-posts $C^3$ $C^3$. (See Fig. 1.)

The low-resistance coil may be made of relatively coarse wire, or, as shown, of flat bands, of copper or other suitable material. These coils are supported in a suitable bobbin, D, which may be supported in a suitable manner on the base A; but in this instance the bobbin is set in the base, as clearly shown in Fig. 3, and secured to the base by brackets D', as shown in Fig. 2. The binding-posts B' $C^3$ are secured to a plate of insulating material, $D^2$, which is attached to the back of the bobbin D.

At the front of the bobbin is secured a bracket, $D^3$, for supporting the quadrantal needle-box E, covered with a glass plate, E', the front of the bracket being supported by a post, A', secured in the base. In the bottom of the box is a scale, $E^2$, extended on a straight line, which is substantially the chord of the arc of the quadrant and which is divided from its center, which is zero, in both directions, the dividing-lines all converging to the centre, at which the pointer or indicator $E^3$ is mounted, as clearly shown in Fig. 1.

At the pivot which supports the pointer the latter is secured to or formed as a part of a disk or other suitable form of plate, $E^4$, to which are secured four (more or less) magnets or needles, F, which are arranged at right angles to the pointer. The box is secured to the bracket $D^3$ by means of a hollow bolt, G, interiorly screw-threaded to receive an adjusting-screw, G', which carries the pointer-supporting or center pin, $G^2$. The bolt G is also exteriorly screw-threaded to receive a nut, $G^3$, and, if desired, a washer, $G^4$, between which and the lower surface of the bracket $D^3$ is arranged a cross bar or plate, H, which serves to support the magnets, hereinafter described.

At the front of the bobbin is secured a bracket, I, through which is passed a rod, I', having at its lower end a disk or plate, $I^2$, arranged beneath the pointer and the magnets or needles thereon, the purpose of the rod and plate being to raise the pointer and needles upwardly from the pointer-supporting pin $G^2$ against the glass E', to preserve the needle and magnets from injury during transportation or when not in use.

The plate H extends completely across the instrument and is provided at each end with ways or gibs H', for the reception of a carriage, J, which is secured to or formed as a part of a brass tube, J'. In each of the tubes is secured a permanent magnet, K, and that adjustably by means of a set-screw, K'. At the front end of the tube J' is a bracket, $J^2$, carrying a nut, $J^3$, which rides upon a rod, L, having at one end a left-hand thread and at the opposite end a right-hand thread, and at each extreme end a milled nut, L'. Bridges $L^2$ are secured at the outer ends of the plate H, and serve to support the rod L at each end thereof.

Upon any part of the carriage or the tube, as at $K^2$, an indicating mark or pointer is provided, and upon the plate H, at one end thereof, is provided a scale to be used in measuring volts, and like provisions are made at the opposite end of the plate to be used in measuring ampères. The divisions of these scales have a certain known relation to the scale E², over which the pointer E³ travels.

The divisions of the scales E² K³, as well as their relation to each other, are entirely arbitrary, the principle involved being that the influence of the magnets K upon the needle-magnets F increases as the square of the distance between them (the magnets K and F) diminishes, and therefore when the current being measured causes the pointer to pass beyond the limits of the scale E² the resistance of the pointer is increased by increasing the action of magnets K on the magnets F, and that proportionately and as indicated on the scales K³, as hereinafter described.

The exact position of the numbers on the scales K³ may preferably be determined by comparison with standard instruments or by using currents of known values. For example, to find the proper places for the numbers on the ampère scale I pass a known current—say of eight ampères—through the inner coil, and then I move the magnets K and increase or diminish the deflection of the pointer E³ until it is eight divisions of the scale E². I then mark the position of the pointer K² "1." When the instrument is used with the magnets in this position, one degree of deflection indicates one ampère of current. Now I move the magnets until the deflection is four (the current in the coil being still eight ampères) and mark the position of the indicator K² "2," being the number by which we must multiply the deflection to obtain ampères when the magnets are in this position. In like manner the volt-scale is determined, using a current of known value passing through the posts B' B' and the coil B.

This being the construction, the operation is as follows: The magnets or needles attached to the pointer are arranged in a horizontal plane with and at right angles to the axis of the two coils B and C, and are therefore so influenced by a current passing through either coil that they tend to assume a position parallel with said axis, and in so doing they actuate the pointer to move over the scale for a distance dependent upon the strength of the current influencing the needles. The permanent magnets K have a constant tendency to maintain the magnets or needles F at a right angle to the axis of the coils, so that when no current is passing through either of the coils the pointer stands at zero.

If the pointer, by reason of magnetic influence of extraneous objects, should stand at either side of zero, it may be primarily adjusted by moving the plate H on the bolt G, so as to change the relative positions of the permanent and needle magnets, whereby the pointer will be brought to zero. This capability of adjustment of the scale to the pointer is not usually required, because the permanent magnets K are of sufficient strength to overcome incidental magnetic disturbances of the character mentioned.

When the difference of potential of two points is to be measured, they are connected with the binding-posts B', in order to conduct the current through the high-resistance coil B. Should this current deflect the pointer beyond the range of the scale E³, then the milled nut L', at the end of the rod L, is turned so as to bring the magnets K nearer the magnets or needles F upon the pointer, whereby the magnetic field is increased, so as to reduce the attraction of the current being measured to such an extent that it shall not cause the pointer to pass beyond the limits of the scale E². In the operation of the rod L, and the consequent movement of the magnets toward each other, the indicator K² is caused to travel upon the scale K³, so that the number of divisions of the scale E² over which the pointer is caused to pass is to be multiplied by the number of divisions of the scale K³ over which the carriage and magnet have previously been caused to pass, to confine the oscillations of the pointer within the limits of the scale, in order to ascertain the number of volts of the current measured. In a like manner ampères are measured by conducting the current through the coils C, the terminals of the circuit being connected with the binding-posts C³.

By means of the set-screw K' the pointers K² themselves may be relatively adjusted to equalize the individual influence of each of the magnets or needles F in case their strengths vary, or in case a new magnet is replaced for either or both. By arranging the scale E² upon a straight line and the divisions thereof concentric with the pivot of the pointer, the use of or reference to tangent tables is obviated, as the divisions themselves coincide exactly with the angles of oscillations of the pointer, and by arranging scales upon the plate which supports the carriages bearing the field-magnets, which are themselves adjustably secured to the carriages, accurate means are provided for the independent adjustment of each of said field-magnets.

Having described my invention and its operation, what I claim is—

1. In an instrument for measuring electrical currents, two electrically independent coils, a single indicating mechanism concentric to both coils, field-magnets movable in a horizontal plane with and at right angles to the axis of the coils, and scales for indicating the position of the field-magnets, substantially as specified.

2. In an electrical-current indicator, field-magnets arranged at a right angle to the axis of the coil or coils and connected by a rod, and a left and right handed screw for their operation, substantially as specified.

3. In a combined ampère and volt meter, movable field-magnets and independent scales for indicating the position of the field-magnets, one scale being to indicate the position of the field-magnets for different degrees of sensibility when the instrument is used to measure volts and the other being similarly used to measure ampères, substantially as specified.

4. In an instrument for measuring electrical currents, a pointer having magnets secured thereto and at right angles therewith, and field-magnets arranged in line with and at opposite ends of the pointer-magnets, and a right and left threaded rod connected with the field-magnets, whereby they are adapted to be moved to and fro upon that line, substantially as specified.

5. In an instrument for measuring electrical currents, a pointer having magnets secured thereto and at right angles therewith, and field-magnets arranged in line with and at opposite ends of the pointer-magnets, and a right and left threaded rod connected with the field-magnets, whereby they are adapted to be moved to and fro upon that line, and a high-resistance coil and a low-resistance coil arranged parallel with the field-magnets, substantially as specified.

6. In an instrument for measuring electrical currents, a base, a bobbin for supporting the coil or coils, a bracket for concentrically supporting indicating mechanism, and a cross-bar secured to the bracket and provided with field-magnet-supporting devices, substantially as specified.

7. The combination of the bobbin D, the bracket $D^3$, the box E, the pivot or bolt G, plate H, and field-magnets at each end thereof, and the nut $G^3$, as a means for pivotally supporting and admitting of the adjustment of the field-magnets, substantially as specified.

8. The combination of the bracket $D^3$, cross-plate H, carriages J J', magnets K, bridges $J^2$ $L^2$, nuts $J^3$, and right and left hand screw-threaded shaft L, substantially as specified.

9. The combination of the base A, bobbin D, coils B and C, binding-posts B' $C^3$, pointer $E^3$, having magnets F, and field-magnets K, mounted in ways H' on the plate H, substantially as specified.

10. The combination of the quadrantal box E, the concentric scale $E^2$, the pointer P, having the magnets F, the coils B and C, with the filed-magnets K, substantially as specified.

In testimony whereof I affix my signature in presence of two witnesses.

RODERICK MACRAE.

Witnesses:
LEE PURCELL,
A. W. BRADFORD, Jr.